(12) United States Patent
Riefe et al.

(10) Patent No.: US 10,496,102 B2
(45) Date of Patent: Dec. 3, 2019

(54) STEERING SYSTEM FOR AUTONOMOUS VEHICLE

(71) Applicant: STEERING SOLUTIONS IP HOLDING CORPORATION, Saginaw, MI (US)

(72) Inventors: Richard K. Riefe, Saginaw, MI (US); John F. Schulz, Hemlock, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 225 days.

(21) Appl. No.: 15/095,717

(22) Filed: Apr. 11, 2016

(65) Prior Publication Data
US 2017/0293306 A1 Oct. 12, 2017

(51) Int. Cl.
*G05D 1/02* (2006.01)
*B60K 37/02* (2006.01)
(Continued)

(52) U.S. Cl.
CPC .......... *G05D 1/0246* (2013.01); *B60K 35/00* (2013.01); *B60K 37/02* (2013.01); *B60K 37/06* (2013.01); *B62D 1/02* (2013.01); *B62D 1/12* (2013.01); *B62D 15/025* (2013.01); *B62D 15/027* (2013.01); *G05D 1/0016* (2013.01); *G05D 1/0044* (2013.01); *G05D 1/0088* (2013.01); *B60K 2370/126* (2019.05);
(Continued)

(58) Field of Classification Search
CPC ...... B62D 15/025; B62D 15/027; B62D 1/02; B62D 1/12; G05D 1/0246; G05D 1/0242; G05D 1/0255; G05D 1/0055; G05D 1/02; G05D 1/0016; G05D 1/0088; G05D 1/0044; G05D 2201/0213; B60T 2201/08; B60T 2201/087; B60K 28/02; B60K 35/00; B60K 2350/1024; B60K 2350/1008; B60K 37/02; B60K 2350/355; B60K 2350/1028; B60K 2350/1048; B60K 37/06; B60K 2370/782; B60K 2370/1442; B60K 2370/126; B60K 2370/55; B60K 2370/135; B60K 2370/1438
USPC .............. 701/41; 180/168; 340/439; 348/119
See application file for complete search history.

(56) References Cited

U.S. PATENT DOCUMENTS

| | | |
|---|---|---|
| 4,315,117 A | 2/1982 | Kokubo et al. |
| 4,337,967 A | 7/1982 | Yoshida et al. |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

EP Application No. 14156903.8 Extended European Search Report, dated Jan. 27, 2015, 10 pages.

(Continued)

*Primary Examiner* — Nga X Nguyen

(57) ABSTRACT

A steering system for an autonomous vehicle includes an autonomous driving assist steering system for controlling steering of the autonomous vehicle in a primary steering mode. Also included is an alternate steering mechanism controlling steering of the autonomous vehicle in a secondary steering mode, wherein the alternate steering mechanism is not a steering wheel.

13 Claims, 3 Drawing Sheets

(51) Int. Cl.
*B62D 1/12* (2006.01)
*B62D 15/02* (2006.01)
*G05D 1/00* (2006.01)
*B62D 1/02* (2006.01)
*B60K 35/00* (2006.01)
*B60K 37/06* (2006.01)

(52) U.S. Cl.
CPC ................. *B60K 2370/135* (2019.05); *B60K 2370/1438* (2019.05); *B60K 2370/1442* (2019.05); *B60K 2370/55* (2019.05); *B60K 2370/782* (2019.05); *G05D 2201/0213* (2013.01)

(56) References Cited

U.S. PATENT DOCUMENTS

| | | | |
|---|---|---|---|
| 4,503,300 A | 3/1985 | Lane, Jr. | |
| 4,503,504 A | 3/1985 | Suzumura et al. | |
| 4,561,323 A | 12/1985 | Stromberg | |
| 4,691,587 A | 9/1987 | Farrand et al. | |
| 4,836,566 A | 6/1989 | Birsching | |
| 4,921,066 A | 5/1990 | Conley | |
| 4,962,570 A | 10/1990 | Hosaka et al. | |
| 4,967,618 A | 11/1990 | Matsumoto et al. | |
| 4,976,239 A | 12/1990 | Hosaka | |
| 5,240,284 A | 8/1993 | Takada et al. | |
| 5,295,712 A | 3/1994 | Omura | |
| 5,319,803 A | 6/1994 | Allen | |
| 5,488,555 A | 1/1996 | Asgari | |
| 5,618,058 A | 4/1997 | Byon | |
| 5,668,721 A | 9/1997 | Chandy | |
| 5,690,362 A | 11/1997 | Peitsmeier et al. | |
| 5,765,116 A * | 6/1998 | Wilson-Jones | B62D 15/025 180/168 |
| 5,893,580 A | 4/1999 | Hoagland et al. | |
| 5,911,789 A | 6/1999 | Keipert et al. | |
| 6,070,686 A | 6/2000 | Pollmann | |
| 6,138,788 A | 10/2000 | Bohner et al. | |
| 6,170,862 B1 | 1/2001 | Hoagland et al. | |
| 6,212,453 B1 | 4/2001 | Kawagoe et al. | |
| 6,227,571 B1 | 5/2001 | Sheng et al. | |
| 6,256,561 B1 | 7/2001 | Asanuma | |
| 6,301,534 B1 | 10/2001 | McDermott, Jr. | |
| 6,354,622 B1 | 3/2002 | Ulbrich et al. | |
| 6,360,149 B1 | 3/2002 | Kwon et al. | |
| 6,373,472 B1 | 4/2002 | Palalau et al. | |
| 6,381,526 B1 | 4/2002 | Higashi et al. | |
| 6,390,505 B1 | 5/2002 | Wilson | |
| 6,481,526 B1 | 11/2002 | Millsap et al. | |
| 6,575,263 B2 | 6/2003 | Hjelsand et al. | |
| 6,578,449 B1 | 6/2003 | Anspaugh et al. | |
| 6,598,695 B1 | 7/2003 | Menjak et al. | |
| 6,612,392 B2 | 9/2003 | Park et al. | |
| 6,612,393 B2 | 9/2003 | Bohner et al. | |
| 6,778,890 B2 | 8/2004 | Shimakage et al. | |
| 6,799,654 B2 | 10/2004 | Menjak et al. | |
| 6,817,437 B2 | 11/2004 | Magnus et al. | |
| 6,819,990 B2 | 11/2004 | Ichinose | |
| 6,820,713 B2 | 11/2004 | Menjak et al. | |
| 6,889,792 B1 | 5/2005 | Fardoun et al. | |
| 7,021,416 B2 | 4/2006 | Kapaan et al. | |
| 7,048,305 B2 | 5/2006 | Muller | |
| 7,062,365 B1 | 6/2006 | Fei | |
| 7,295,904 B2 | 11/2007 | Kanevsky et al. | |
| 7,308,964 B2 | 12/2007 | Hara et al. | |
| 7,428,944 B2 | 9/2008 | Gerum | |
| 7,461,863 B2 | 12/2008 | Muller | |
| 7,495,584 B1 | 2/2009 | Sorensen | |
| 7,628,244 B2 | 12/2009 | Chino et al. | |
| 7,719,431 B2 | 5/2010 | Bolourchi | |
| 7,735,405 B2 | 6/2010 | Parks | |
| 7,793,980 B2 | 9/2010 | Fong | |
| 7,862,079 B2 | 1/2011 | Fukawatase et al. | |
| 7,894,951 B2 | 2/2011 | Norris et al. | |
| 7,909,361 B2 | 3/2011 | Oblizajek et al. | |
| 8,002,075 B2 | 8/2011 | Markfort | |
| 8,027,767 B2 | 9/2011 | Klein et al. | |
| 8,055,409 B2 | 11/2011 | Tsuchiya | |
| 8,069,745 B2 | 12/2011 | Strieter et al. | |
| 8,079,312 B2 | 12/2011 | Long | |
| 8,146,945 B2 | 4/2012 | Born et al. | |
| 8,150,581 B2 | 4/2012 | Iwazaki et al. | |
| 8,170,725 B2 | 5/2012 | Chin et al. | |
| 8,170,751 B2 | 5/2012 | Lee et al. | |
| 8,260,482 B1 | 9/2012 | Szybalski et al. | |
| 8,352,110 B1 | 1/2013 | Szybalski et al. | |
| 8,452,492 B2 | 5/2013 | Buerkle et al. | |
| 8,479,605 B2 | 7/2013 | Shavrnoch et al. | |
| 8,548,667 B2 | 10/2013 | Kaufmann | |
| 8,606,455 B2 | 12/2013 | Boehringer et al. | |
| 8,632,096 B1 | 1/2014 | Quinn et al. | |
| 8,634,980 B1 | 1/2014 | Urmson et al. | |
| 8,650,982 B2 | 2/2014 | Matsuno et al. | |
| 8,670,891 B1 | 3/2014 | Szybalski et al. | |
| 8,695,750 B1 | 4/2014 | Hammond et al. | |
| 8,725,230 B2 | 5/2014 | Lisseman et al. | |
| 8,798,852 B1 | 8/2014 | Chen et al. | |
| 8,818,608 B2 | 8/2014 | Cullinane et al. | |
| 8,825,258 B2 | 9/2014 | Cullinane et al. | |
| 8,825,261 B1 | 9/2014 | Szybalski et al. | |
| 8,843,268 B2 | 9/2014 | Lathrop et al. | |
| 8,874,301 B1 | 10/2014 | Rao et al. | |
| 8,880,287 B2 | 11/2014 | Lee et al. | |
| 8,881,861 B2 | 11/2014 | Tojo | |
| 8,899,623 B2 | 12/2014 | Stadler et al. | |
| 8,909,428 B1 | 12/2014 | Lombrozo | |
| 8,948,993 B2 | 2/2015 | Schulman et al. | |
| 8,950,543 B2 | 2/2015 | Heo et al. | |
| 8,994,521 B2 | 3/2015 | Gazit | |
| 9,002,563 B2 | 4/2015 | Green et al. | |
| 9,031,729 B2 | 5/2015 | Lathrop et al. | |
| 9,032,835 B2 | 5/2015 | Davies et al. | |
| 9,045,078 B2 | 6/2015 | Tovar et al. | |
| 9,073,574 B2 | 7/2015 | Cuddihy et al. | |
| 9,092,093 B2 | 7/2015 | Jubner et al. | |
| 9,108,584 B2 | 8/2015 | Rao et al. | |
| 9,134,729 B1 | 9/2015 | Szybalski et al. | |
| 9,150,200 B2 | 10/2015 | Urhahne | |
| 9,150,224 B2 | 10/2015 | Yopp | |
| 9,159,221 B1 | 10/2015 | Stantchev | |
| 9,164,619 B2 | 10/2015 | Goodlein | |
| 9,174,642 B2 * | 11/2015 | Wimmer | B60K 35/00 |
| 9,186,994 B2 | 11/2015 | Okuyama et al. | |
| 9,193,375 B2 | 11/2015 | Schramm et al. | |
| 9,199,553 B2 | 12/2015 | Cuddihy et al. | |
| 9,227,531 B2 | 1/2016 | Cuddihy et al. | |
| 9,233,638 B2 | 1/2016 | Lisseman et al. | |
| 9,235,111 B2 | 1/2016 | Davidsson et al. | |
| 9,235,211 B2 | 1/2016 | Davidsson et al. | |
| 9,235,987 B2 | 1/2016 | Green et al. | |
| 9,238,409 B2 | 1/2016 | Lathrop et al. | |
| 9,248,743 B2 | 2/2016 | Enthaler et al. | |
| 9,260,130 B2 | 2/2016 | Mizuno | |
| 9,290,174 B1 | 3/2016 | Zagorski | |
| 9,290,201 B1 | 3/2016 | Lombrozo | |
| 9,298,184 B2 | 3/2016 | Bartels et al. | |
| 9,308,857 B2 | 4/2016 | Lisseman et al. | |
| 9,308,891 B2 | 4/2016 | Cudak et al. | |
| 9,315,210 B2 * | 4/2016 | Sears | B62D 13/00 |
| 9,333,983 B2 | 5/2016 | Lathrop et al. | |
| 9,352,752 B2 | 5/2016 | Cullinane et al. | |
| 9,360,865 B2 | 6/2016 | Yopp | |
| 9,725,098 B2 | 8/2017 | Abou-Nasr et al. | |
| 9,810,727 B2 | 11/2017 | Kandler et al. | |
| 9,845,109 B2 | 12/2017 | George et al. | |
| 9,852,752 B1 | 12/2017 | Chou et al. | |
| 9,868,449 B1 | 1/2018 | Holz et al. | |
| 10,040,330 B2 | 8/2018 | Anderson | |
| 2002/0016661 A1 | 2/2002 | Frediani et al. | |
| 2003/0046012 A1 | 3/2003 | Yamaguchi | |
| 2003/0094330 A1 | 5/2003 | Boloorchi et al. | |
| 2003/0227159 A1 | 12/2003 | Muller | |
| 2004/0016588 A1 | 1/2004 | Vitale et al. | |
| 2004/0046346 A1 | 3/2004 | Eki et al. | |

(56) References Cited

U.S. PATENT DOCUMENTS

| | | |
|---|---|---|
| 2004/0099468 A1 | 5/2004 | Chernoff et al. |
| 2004/0129098 A1 | 7/2004 | Gayer et al. |
| 2004/0182640 A1 | 9/2004 | Katou et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1* | 11/2006 | Rossow ............... G06F 9/45537 703/26 |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle |
| 2010/0250081 A1 | 9/2010 | Kinser et al. |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0224876 A1 | 9/2011 | Paholics et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0012469 A1 | 1/2014 | Kunihiro et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0306799 A1 | 10/2014 | Ricci |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 2/2015 | Hahne |
| 2015/0060185 A1 | 3/2015 | Feguri |
| 2015/0120124 A1 | 4/2015 | Bartels et al. |
| 2015/0120141 A1* | 4/2015 | Lavoie ................ B62D 15/027 701/41 |
| 2015/0120142 A1 | 4/2015 | Park et al. |
| 2015/0123947 A1 | 5/2015 | Jubner et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0314804 A1 | 11/2015 | Aoki et al. |
| 2015/0324111 A1 | 11/2015 | Jubner et al. |
| 2015/0338849 A1* | 11/2015 | Nemec ................ G05D 1/0055 701/25 |
| 2016/0009332 A1 | 1/2016 | Sirbu |
| 2016/0071418 A1 | 3/2016 | Oshida et al. |
| 2016/0075371 A1 | 3/2016 | Varunjikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0280251 A1 | 9/2016 | George et al. |
| 2016/0288825 A1 | 10/2016 | Varunjikar et al. |
| 2016/0291862 A1 | 10/2016 | Yaron et al. |
| 2016/0318540 A1 | 11/2016 | King |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0364003 A1 | 12/2016 | O'Brien |
| 2016/0368522 A1 | 12/2016 | Lubischer et al. |
| 2016/0375860 A1 | 12/2016 | Lubischer |
| 2016/0375923 A1 | 12/2016 | Schulz |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau |
| 2016/0375931 A1 | 12/2016 | Lubischer |
| 2017/0029009 A1 | 2/2017 | Rouleau |
| 2017/0029018 A1 | 2/2017 | Lubischer |
| 2017/0066473 A1 | 3/2017 | Yu et al. |
| 2017/0101032 A1 | 4/2017 | Sugioka et al. |
| 2017/0101127 A1 | 4/2017 | Varunjikar et al. |
| 2017/0113712 A1 | 4/2017 | Watz |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0203785 A1 | 7/2017 | Naik et al. |
| 2017/0225704 A1 | 8/2017 | Urushibata |
| 2017/0232998 A1 | 8/2017 | Ramanujam et al. |
| 2017/0240204 A1* | 8/2017 | Raad ................ B62D 15/025 |
| 2017/0297606 A1 | 10/2017 | Kim et al. |
| 2017/0305425 A1 | 10/2017 | Xing |
| 2017/0305458 A1 | 10/2017 | Wang et al. |
| 2018/0015948 A1 | 1/2018 | Varunjikar et al. |
| 2018/0148087 A1 | 5/2018 | Wang et al. |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102027458 A | 4/2011 |
| CN | 102320324 A | 1/2012 |
| CN | 102452391 A | 5/2012 |
| CN | 202563346 U | 11/2012 |
| CN | 102939474 A | 2/2013 |
| CN | 103158699 A | 6/2013 |

(56) References Cited

FOREIGN PATENT DOCUMENTS

| | | |
|---|---|---|
| CN | 103419840 A2 | 12/2013 |
| CN | 103448785 A | 12/2013 |
| CN | 103677253 A | 3/2014 |
| CN | 103777632 A | 5/2014 |
| CN | 103818386 A | 5/2014 |
| CN | 104024084 A | 9/2014 |
| CN | 104936850 A | 9/2015 |
| CN | 104968554 A | 10/2015 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| DE | 102014204855 A1 | 9/2014 |
| DE | 102013110865 A1 | 4/2015 |
| DE | 102014223128 A1 | 5/2016 |
| EP | 1559630 A2 | 8/2005 |
| EP | 1783719 A2 | 5/2007 |
| EP | 1932745 A2 | 6/2008 |
| EP | 2426030 A1 | 3/2012 |
| EP | 2489577 A2 | 8/2012 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H05162652 A | 6/1993 |
| JP | 2768034 B2 | 6/1998 |
| JP | 2004074845 A | 3/2004 |
| JP | 2007253809 A | 10/2007 |
| JP | 2011043884 A | 3/2011 |
| JP | 20174099 A | 1/2017 |
| KR | 20100063433 A | 6/2010 |
| WO | 0147762 A1 | 7/2001 |
| WO | 2006099483 A1 | 9/2006 |
| WO | 2007034567 A1 | 3/2007 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
Yan, et al., "EPS Control Technology Based on Road Surface Conditions," Jun. 22-25, 2009, pp. 933-938, 2009 IEEE International Conference on Information and Automation.

* cited by examiner

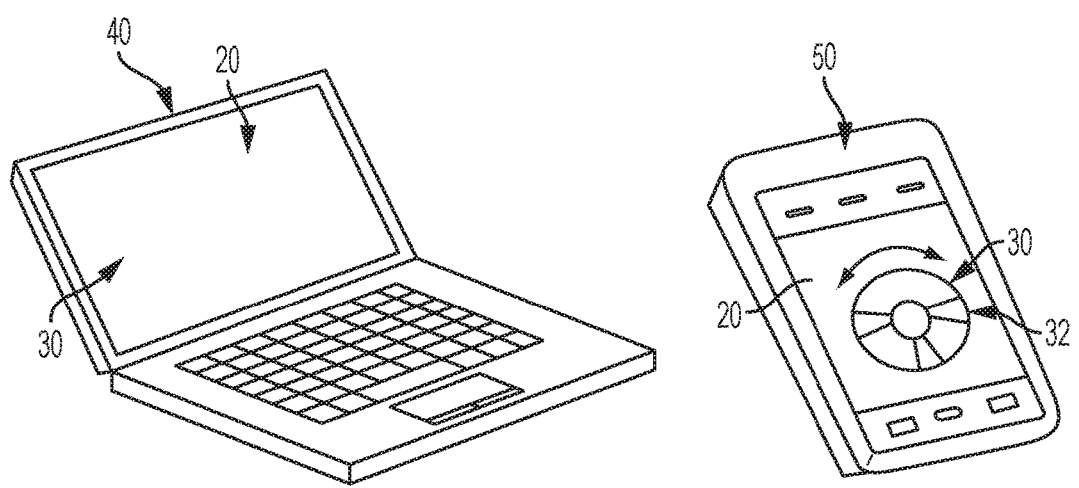

STEERING SYSTEM FOR AUTONOMOUS VEHICLE

BACKGROUND OF THE INVENTION

The embodiments described herein relate to vehicle steering systems and, more particularly, to a steering system for an autonomous vehicle.

Vehicles may be equipped with systems and devices to semi-autonomously or autonomously control a vehicle and perform vehicle maneuvers. The systems or devices may provide driving control with minimal driver intervention to reduce the driving burden on the driver. Some systems or devices may enable vehicles to lack a traditional steering wheel, and possibly steering column, for use as the human to machine interface. However, such a vehicle may occasionally lack the ability to perform highly specialized steering functions.

SUMMARY OF THE INVENTION

According to one aspect of the invention, a steering system for an autonomous vehicle includes an autonomous driving assist steering system for controlling steering of the autonomous vehicle in a primary steering mode. Also included is a touch screen illustrating a vehicle environment and comprising at least one steering control image for interaction by a user to control steering of the autonomous vehicle in a secondary steering mode.

According to another aspect of the invention, a steering system for an autonomous vehicle includes an autonomous driving assist steering system for controlling steering of the autonomous vehicle in a primary steering mode. Also included is a joystick controlling steering of the autonomous vehicle in a secondary steering mode.

According to yet another aspect of the invention, a steering system for an autonomous vehicle includes an autonomous driving assist steering system for controlling steering of the autonomous vehicle in a primary steering mode. Also included is an alternate steering mechanism controlling steering of the autonomous vehicle in a secondary steering mode, wherein the alternate steering mechanism is not a steering wheel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 is a perspective view of the alternate steering mechanism according to another aspect of the invention;

FIG. 3 is a perspective view of the alternate steering mechanism according to yet another aspect of the invention.

DETAILED DESCRIPTION

Referring to the Figures, where the invention will be described with reference to specific embodiments, without limiting same, a steering system for an autonomous vehicle or a selectively autonomous vehicle is provided and generally referenced with numeral 10. The steering system 10 provides a primary steering mode (which is an autonomous steering mode as used herein) and a secondary steering mode (which can be a semi-autonomous or manual mode as used herein), with each controlling movement of vehicle road wheels for directional control of the vehicle. Autonomous steering of the vehicle is advantageous in autonomous or semi-autonomous driving modes of a vehicle. Autonomous driving refers to vehicles that are configured to perform operations without continuous input from a driver (e.g., steering, accelerating, braking etc.) and may be equipped with advanced driver assist system(s), including an autonomous driving assist steering system 12, to allow the vehicle to be autonomously controlled using sensing, steering, and/or braking technology. When the advanced driver assist system is activated, the steering wheel is not required for vehicle control. Therefore, the embodiments described herein do not include a steering wheel. Additionally, a steering column may be omitted from the vehicle. Elimination of the steering column and/or steering wheel increases the space within the vehicle interior, thereby enhancing passenger comfort.

The embodiments of the steering system 10 described herein rely on the autonomous driving assist steering system 12 to control steering of the vehicle in a primary steering mode. The primary steering mode is activated during normal operating conditions of the vehicle and do not require human operator input in a physical form that is required in traditional steering systems (e.g., manipulation of a steering wheel). In some cases, limitations of the primary steering mode may be present, as the advanced driving assist steering system 12 relies on various forms of technology to operate. Exemplary technologies relied upon include GPS location, proximity sensors, lane keeping, and vehicle-to-infrastructure recognition, etc. Infrequently, one or more of the technologies relied upon may be unavailable, thus requiring activation of the secondary, alternate driving mode. Maneuvering within a parking garage, maneuvering within a maintenance garage, and maneuvering during loading or unloading of the vehicle from a factory site to a dealership via commercial carrier are examples of situations that make the secondary driving mode desirable. The preceding list of examples is merely illustrative and not intended to be limiting.

Figure 1:
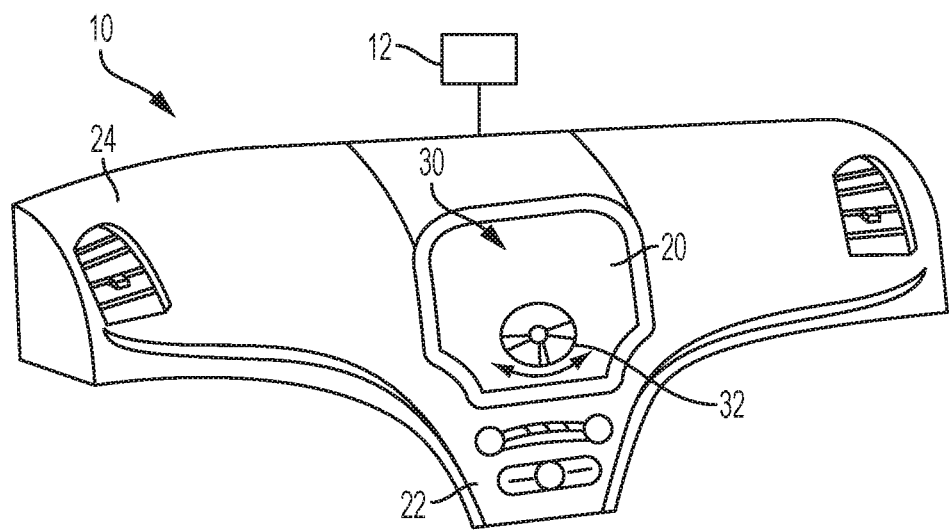
FIG. 1 is a perspective view of an alternate steering mechanism for an autonomous vehicle according to an aspect of the invention.
Figure 4:
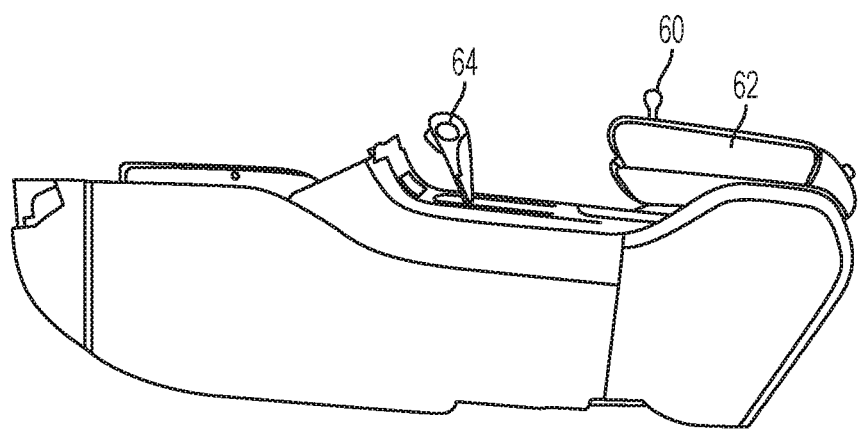
FIG. 4 is a perspective view of the alternate steering mechanism according to yet another aspect of the invention.

Referring to FIG. 1, an embodiment of the steering system 10 is illustrated. As described above, the steering system 10 includes the autonomous driving assist steering system 12 to control steering in a primary steering mode. An alternate steering mechanism is provided to facilitate control while the steering system 10 is in the secondary steering mode. In the illustrated embodiment, the alternate steering mechanism is a touch screen 20 that is provided to allow a user to interact therewith to control steering of the vehicle in the secondary steering mode. Inputs provided by the user are communicated to the advanced driving assist system for control of a vehicle steering system controller (e.g., electrical assisted power steering mechanism). The touch screen 20 is located on, and/or within, a center stack 22 of the vehicle in the illustrated embodiment. In other embodiments, the touch screen 20 is disposed within other fixed locations of the vehicle interior that are easily accessible to the user. For example, the touch screen 20 may be located at any location along a dashboard 24 or on an armrest 62 (FIG. 4).

Regardless of the precise position of the touch screen 20, the touch screen 20 includes a steering control image 30 displayed thereon. In one embodiment, the steering control image 30 is at least one camera image illustrating an environment surrounding the autonomous vehicle mapped out with cameras and/or proximity sensors. In such an embodiment, a user may trace a desired path with a finger on the touch screen to program a steering path to maneuver the vehicle within the surrounding environment. Alternatively, a virtual steering wheel 32 may be included within the steering control image 30. The virtual steering wheel 32 provides an interactive control that is visually similar to a steering wheel. The virtual steering wheel 32 may be rotated by the user to input steering commands in the secondary steering mode. In some embodiments, a keyboard may be provided to serve as an interface for operator input. Steering in the secondary steering mode may be used to perform specialized steering maneuvers, such as steering the vehicle into a repair bay or guiding the vehicle on/off a loading ramp of a vehicle delivery trailer. These are merely examples of the specialized maneuvers that may be achieved with the secondary steering mode.

Referring now to FIGS. 2 and 3, alternate locations of the touch screen 20 are illustrated. In some embodiments, the touch screen 20 is located on a display of a laptop computer 40 (FIG. 2) or a portable device 50 (FIG. 3), such as a cellular phone or a tablet. In such embodiments, the laptop 40 or the portable device 50 is in wired or wireless communication with the advanced driving assist system to communicate the user inputs from the device to the advanced driving assist system for control of a vehicle steering system controller (e.g., electrical assisted power steering mechanism).

As with the embodiment of the touch screen 20 described above in connection with FIG. 1, a virtual steering wheel 32 may be provided on the steering control image 30 or a mapped out surrounding environment may be provided. In embodiments with the portable device 50, an app may be used to enhance functionality of the steering system 10.

Referring to FIG. 4, an alternate embodiment of the alternate steering mechanism is illustrated. In the illustrated embodiment, the alternate steering mechanism comprises a joystick 60, knob or the like, that is in communication with the advanced driving assist system for control of a vehicle steering system controller (e.g., electrical assisted power steering mechanism) while the steering system 10 is in the secondary steering mode. The joystick 60 is a pivotable member and may be located in numerous contemplated locations of the vehicle interior. For example, the joystick 60 may be located on a dashboard 24 of the autonomous vehicle, on a center stack 22 of the autonomous vehicle, on a door of the autonomous vehicle, or on an armrest 62 of the autonomous vehicle. Additionally, the joystick 60 may be integrated with a transmission shift lever 64 (e.g., PRNDL lever). Irrespective of the precise location of the joystick 60, the user is able to maneuver the vehicle with the joystick 60.

Advantageously, specialized steering maneuvers are facilitated in the secondary steering mode, while permitting removal of the steering column and/or steering wheel to enhance the vehicle interior compartment by increasing available space.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering system for an autonomous vehicle comprising:
an autonomous driving assist steering system for controlling steering of the autonomous vehicle in a primary steering mode, the steering system not including a steering wheel; and
a touch screen illustrating a vehicle environment and comprising at least one steering control image for interaction by a user to control steering of the autonomous vehicle in a secondary steering mode, the steering control image comprising a virtual steering wheel rotatable by the user.

2. The steering system of claim 1, wherein the steering control image comprises at least one camera image illustrating an environment surrounding the autonomous vehicle.

3. The steering system of claim 1, wherein the steering control image comprises a GPS navigation map.

4. The steering system of claim 3, wherein the user interacts with the GPS navigation map by tracing out a path.

5. The steering system of claim 1, wherein the touch screen is located on a dashboard of the autonomous vehicle.

6. The steering system of claim 1, wherein the touch screen is located on a center stack of the autonomous vehicle.

7. The steering system of claim 1, wherein the touch screen is located on an armrest in the autonomous vehicle.

8. The steering system of claim 1, wherein the touch screen is located on a display of a portable device in operative communication with the autonomous vehicle.

9. The steering system of claim 8, wherein the portable device is one of a phone, tablet and laptop.

10. A steering system for an autonomous vehicle comprising:
an autonomous driving assist steering system for controlling steering of the autonomous vehicle in a primary steering mode, the steering system not including a steering wheel; and
an alternate steering mechanism manually controlling steering of the autonomous vehicle in a secondary steering mode, wherein the alternate steering mechanism is not a steering wheel.

11. A steering system for an autonomous vehicle comprising:
an autonomous driving assist steering system for controlling steering of the autonomous vehicle in a primary steering mode, the steering system not including a steering wheel; and
a touch screen illustrating a vehicle environment for interaction by a user to control steering of the autonomous vehicle in a secondary steering mode, steering in the secondary steering mode being controlled by an interactive control on the touch screen.

12. The steering system of claim 11, wherein the interactive control comprises tracing out a path on the touch screen.

13. The steering system of claim 11, wherein the interactive control comprises a virtual steering wheel.

\* \* \* \* \*